July 12, 1932.  M. L. HACKER ET AL  1,867,004
THROTTLE VALVE MECHANISM
Filed July 30, 1928
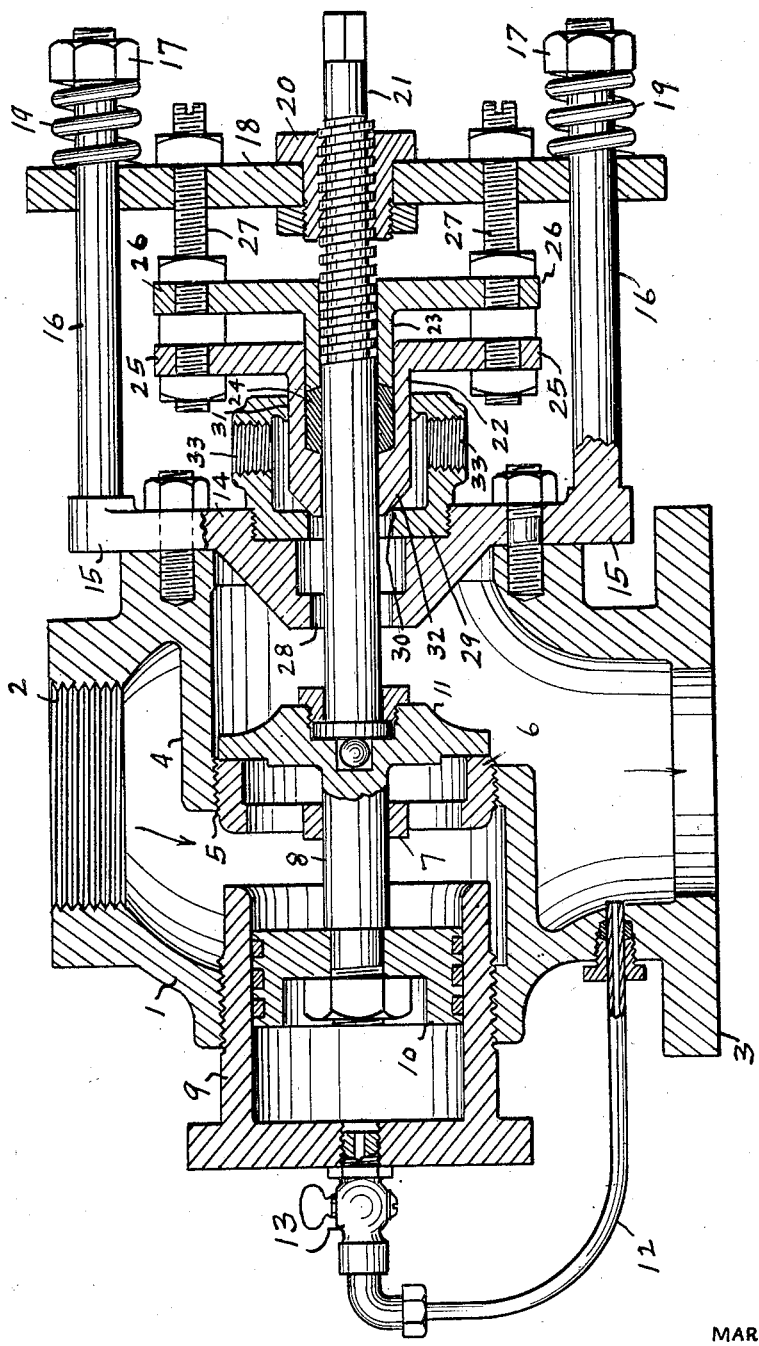
Inventors
MARCUS L. HACKER,
JOHN W. WELLS,
LOUIS P. HACKER, AND
LAWRENCE D. BARNER.
By Hardway Tathen
Attorneys Patented July 12, 1932

1,867,004

UNITED STATES PATENT OFFICE

MARCUS L. HACKER, JOHN W. WELLS, AND LOUIS P. HACKER, OF BEAUMONT, AND LAWRENCE D. BARNER, OF GUFFEY, TEXAS, ASSIGNORS, BY MESNE ASSIGNMENTS, TO CRAUSBAY SUPPLY CO. INC., OF BEAUMONT, TEXAS, A CORPORATION OF TEXAS

THROTTLE VALVE MECHANISM

Application filed July 30, 1928. Serial No. 296,392.

This invention relates to new and useful improvements in a throttle valve mechanism.

One object of the invention is to provide a mechanism of the character described specially designed for the purpose of controlling the application of motive fluid, such as steam, from a generator, such as a boiler, to the apparatus to be driven, such as an engine, and embodies a controlling valve incorporated into a structure such that the valve will be substantially balanced, at all times, between equal or unequal fluid pressures, to the end that the valve may be at all times easily opened or closed irrespective of the pressure of the motive fluid.

Another object of the invention is to provide a valve mechanism of the character described embodying also a release valve through which the pressure fluid from the engine may be relieved, by the operator, if desired, when the controlling valve of the mechanism is closed.

The valve is also capable of general application for use in controlling the flow of any fluid under pressure, through a flow line or fluid passageway.

A further feature of the invention resides in the provision of a valve mechanism of the character described which is of very simple construction may be cheaply produced, readily repaired and which is very efficient, in operation.

With the above and other objects in view, the invention has particular relation to certain novel features of construction operation and arrangement of parts an example of which is given in this specification and illustrated in the accompanying drawing, wherein:—

The figure shows a longitudinal sectional view of the valve mechanism.

Referring now more particularly to the drawing, the numeral 1 designates a globe like casing having at one side a connection 2, to receive an inlet pipe and opposing this connection the casing has a flange 3 to adapt it for connection to the engine or for connection into a flow line. The casing has a transverse web or partition 4 having an internally threaded opening 5 into which is threaded the valve seat 6 which may have, if desired, a central bearing 7 through which the piston rod 8 works.

At one end of the casing there is a cylinder 9 having its outer end closed and its inner end open and spaced from the seat 6 and in this cylinder there is a piston 10 anchored to the corresponding end of the piston rod 8.

As stated the piston rod 8 works through the bearing 7 and a control valve 11 is attached to the other end of said rod and cooperates with said seat. There is a bypass pipe 12 connected into the outer end of the cylinder 9 and into the casing 1 on the opposite side of the partition 4. This bypass pipe is controlled by a shut off valve 13.

Opposite the cylinder 9 there is an end plate 14, bolted to the casing 1 and having the oppositely disposed outwardly extending arms 15, 15 and secured to these respective arms are the outwardly extending rods 16, 16 substantially parallel and whose outer ends have the nuts 17, 17 threaded thereon.

There is a yoke 18 whose ends are slidable on the corresponding rods 16 and there are strong coil springs 19, 19 which surround the rods 16 and are interposed between the nuts 17 and the corresponding ends of the yoke 18. There is a gland nut 20 fitted through and secured to the yoke 18 and an actuating stem 21 is threaded through this gland nut and its inner end has a swiveling connection with the valve 11. The outer end of the stem 21 is polygonal to receive a wrench by means of which it may be turned.

There are the outer and inner glands 22, 23, which are fitted closely around the rod 21 with the rod packing 24 between them and these glands have the outwardly extending arms 25, 25 and 26, 26 whose outer ends are adjustably secured to the adjusting bolts 27, 27 whose outer ends, in turn, are adjustably secured to the yoke 18.

The end plate 14 has an axial passageway 28 therethrough through which the rod 21 passes and into the outer end of which is screwed the casing 29. The inner end of this casing has a steam passageway formed with a valve seat 30 and opposite said seat has a bearing 31 through which the outer gland 23 fits snugly. The inner end of said gland is formed into a valve 32 which cooperates with the seat 30. The casing 29 has one or more tapped holes 33, to receive an exhaust pipe or pipes which may be screwed therein.

When the valve 11 is closed the pressure of the motive fluid will be exerted in the opposite directions against the piston 10 and said valve 11 and thus balancing said valve and permitting the same to be readily opened by a suitable manipulation of the rod 21 thus admitting steam to the engine, or permitting the controlled pressure fluid to flow through the valve casing. The pressure on opposite sides of the piston 10 will be rendered more nearly equal by reason of the fact that the pressure fluid may pass through the pipe 12 into the outer end of the cylinder 9. This will permit the easy closing of the valve 11 by reason of the fact that the resistance encountered will be reduced. The valve 11 therefore may be easily closed by suitable manipulation of the rod 21. When this valve is closed the further turning of the rod 21 will lift the valve 32 off of its seat 30 thereby relieving the steam, or other pressure fluid, through the exhaust line connected into the opening 33.

When the valve mechanism herein described is used on an engine throttle particularly of a steam engine, and the control valve is closed to stop the engine, it is often desirable to quickly relieve the motive fluid from the engine cylinders for various reasons well known to those familiar with the operation of engines and for that purpose the relief valve 32 has been provided.

While we have shown what we now consider the preferred form of the invention it is obvious that mechanical changes may be made therein and equivalents substituted for the parts shown and we reserve the right to make such changes and substitutions as may be found desirable within the principle of the invention.

What we claim is:—

1. A valve mechanism including a valve casing having a pressure fluid passageway therethrough, a valve seat in said passageway, a cylinder in the casing on one side of said seat, a by pass conduit leading from said cylinder and connected into said casing on the other side of said seat, a piston in the cylinder, a piston rod connected, at one end, to said piston and extending through said seat, a control valve connected to the other end of said rod and cooperating with said seat, an end plate connected to the casing opposite the cylinder and forming part of said casing and having an outlet opening, a yieldably mounted, outwardly opening relief valve controlling said opening.

2. A valve mechanism including a valve casing having a pressure fluid passageway therethrough, a valve seat in said passageway, a cylinder in the casing on one side of said seat, a by pass conduit leading from said cylinder and connected into said casing on the other side of said seat, a piston in the cylinder, a piston rod connected, at one end, to said piston and extending through said seat, a control valve connected to the other end of said rod and cooperating with said seat, an end plate connected to the casing opposite the cylinder and forming part of said casing and having an outlet opening, a yieldably mounted, outwardly opening relief valve controlling said opening, and means for opening and closing said control valve.

3. A valve mechanism including a valve casing having a motive fluid passageway therethrough, a partition in said casing having a valve seat therein around said passageway, a cylinder in the casing on one side of the partition, a by pass conduit leading from the cylinder into the casing on the other side of the partition, a piston in the cylinder, a piston rod connected, at one end, to the piston and extending through said seat, a valve cooperating with said seat and attached to the other end of said rod, said casing having a relief passageway opposite said cylinder and a relief valve controlling said relief passageway.

4. A valve mechanism including a valve casing having a pressure fluid passageway therethrough, a valve seat surrounding said passageway, a valve adapted to cooperate with said seat and provided to open and close said passageway, means, on one side of the valve, connected to the valve and exposed on one side, to the pressure of said fluid entering said casing, a bypass conduit through which the pressure of the fluid, after it has passed through said seat, may be applied to the other side of said means, said casing having a relief port, on the other side of the valve, and a yieldably mounted relief valve normally closing said relief port.

5. A valve mechanism including a valve casing having a pressure fluid passageway therethrough, a valve seat surrounding said passageway, a valve adapted to cooperate with said seat and provided to open and close said passageway, means, on one side of the valve, connected to the valve and exposed, on one side, to the pressure of said fluid entering said casing, a by pass conduit, through which the pressure of the fluid, after it has passed through said seat may be applied to the other side of said means, an anchor, a valve rod operatively connected to the anchor and to the valve through which the valve may be opened and closed, said casing having a relief port on the other side of the valve and a relief valve controlling said relief port.

6. A valve mechanism including a valve casing having a pressure fluid passageway therethrough, a valve seat surrounding said passageway, a valve adapted to co-operate with said seat and provided to open and close said passageway, means on one side of the valve connected to the valve and exposed on one side, to the pressure of said fluid entering said casing, there being a bypass conduit, through which the pressure fluid, after it has passed through said seat may be applied to the other side of said means, an anchor, a valve rod operatively connected to the anchor and to said valve, through which the valve may be opened, and closed, said casing having a relief port on the other side of said valve, a relief valve controlling said relief port, said rod being operatively connected with said relief valve, through said anchor, and being effective to open the relief valve when the control is closed.

7. A throttle valve mechanism for controlling the application of a motive fluid under pressure and including a casing having a receiving chamber, a valve seat through which the fluid may pass from its source to said chamber, a valve on one side of said seat for controlling the passage of fluid through said seat, a cylinder on the other side of said seat and in alignment therewith, a piston in said cylinder, a piston rod working through said seat to which the valve is attached, there being a passageway for fluid from the receiving chamber into the outer end of said cylinder, means for opening and closing the valve, said casing having a relief port leading from said chamber and a yieldably mounted relief valve normally closing said relief port.

In testimony whereof we have signed our names to this specification.

MARCUS L. HACKER.
JOHN W. WELLS.
LOUIS P. HACKER.
LAWRENCE D. BARNER.